(12) United States Patent
Ueno (10) Patent No.: US 8,928,866 B2
(45) Date of Patent: Jan. 6, 2015

(54) VELOCITY MEASURING DEVICE AND METHOD

(75) Inventor: Tatsuya Ueno, Tokyo (JP)

(73) Assignee: Azbil Corporation, Tokyo (JP)

( * ) Notice: Subject to any disclaimer, the term of this patent is extended or adjusted under 35 U.S.C. 154(b) by 534 days.

(21) Appl. No.: 13/364,523

(22) Filed: Feb. 2, 2012

(65) Prior Publication Data

US 2012/0215484 A1 Aug. 23, 2012

(30) Foreign Application Priority Data

Feb. 23, 2011 (JP) .................................. 2011-036844

(51) Int. Cl.
- *G01P 3/36* (2006.01)
- *G01S 17/32* (2006.01)
- *G01S 17/58* (2006.01)
- *G01S 17/88* (2006.01)
- *G01S 13/34* (2006.01)

(52) U.S. Cl.
CPC ................ *G01P 3/366* (2013.01); *G01S 17/325* (2013.01); *G01S 17/58* (2013.01); *G01S 17/88* (2013.01); *G01S 13/345* (2013.01)
USPC .......................................... 356/28.5; 356/25

(58) Field of Classification Search
CPC ....... G01B 11/26; G01S 7/4915; G01S 17/58; G01C 3/08
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 5,748,295 A | 5/1998 | Farmer | |
| 2009/0279070 A1* | 11/2009 | Ueno | ........................... 356/28.5 |
| 2010/0321668 A1 | 12/2010 | Ueno | |

FOREIGN PATENT DOCUMENTS

JP 2006-313080 A 11/2006

OTHER PUBLICATIONS

Tsukuda, N. et al., "New Range-Finding Speedometer Using a Self-Mixig [SIC] Laser Diode Modulated by Triangular Wave Pulse Current", Instrumentation and Measurement Technology Conference, 1994. (IMTC/94.) Held in Hamamatsu, Japan, May 10-12, 1994. Published in New York by the Institute of Electrical and Electronics Engineers (IEEE) on May 10, 1994. pp. 332-335. DOI: 10.1109/IMTC.1994.352056. ISBN: 978-0-7803-1880-9.

An Extended European Search Report (EESR) dated May 23, 2012 issued by the European Patent Office during the prosecution of European Patent Application No. 12155785.4, which corresponds to the present application.

* cited by examiner

*Primary Examiner* — Luke Ratcliffe
(74) *Attorney, Agent, or Firm* — Troutman Sanders LLP (57) ABSTRACT

A velocity measuring device emitting a laser beam at a web; a photodiode converting an optical output of the laser into an electric signal; a laser driver operating the laser to alternate a first emitting interval wherein the oscillating wavelength increases and a second emitting interval wherein the oscillating wavelength decreases; a current-voltage converting/amplifying portion converting the electric current from the photodiode into a voltage; a filter portion removing a carrier wave from the output of the current-voltage converting/amplifying portion; a signal extracting portion calculating a number of interference waveforms in the output of the filter portion; and a calculator calculating the velocity of the web based on the result of the extracting portion. The laser driver operates so the absolute values for the rates of change, in respect to time, of the oscillating wavelengths during the first emitting interval and during the second emitting interval are different.

8 Claims, 10 Drawing Sheets

PRIOR ART

VELOCITY MEASURING DEVICE AND METHOD

CROSS REFERENCE TO RELATED APPLICATIONS

The present application claims priority under 35 U.S.C. §119 to Japanese Patent Application No. 2011-036844, filed Feb. 23, 2011, which is incorporated herein by reference.

FIELD OF TECHNOLOGY

The present invention relates to a velocity measuring device and method for measuring the velocity of a physical object using electromagnetic wave interference.

BACKGROUND

Conventionally, there have been proposals for wavelength-type velocity measuring devices that use the self-coupling effect of a semiconductor laser (See Japanese Unexamined Patent Application Publication 2006-313080). A structure for this velocity measuring device is given in FIG. 17. The velocity measuring device of FIG. 17 includes a semiconductor laser 201 for emitting a laser beam at an object 210; a photodiode 202 for converting the optical output of the semiconductor laser 201 to an electric signal; a lens 203 for focusing the beam from the semiconductor laser 201 to illuminate the object 210, and to focus the beam returned from the object 210 to cause it to be incident into the semiconductor laser 201; a laser driver 204 for repetitively switching the semiconductor laser 201 between a first emitting interval wherein the oscillating wavelength increases continuously and a second emitting interval wherein the oscillating wavelength decreases continuously; a current-voltage converting amplifying portion 205 for converting and amplifying the output current from the photodiode 202 into a voltage; a signal extracting circuit 206 for deriving a signal from the output voltage of the current-voltage converting amplifying portion 205; a counting device 207 for counting the number of mode-hop pulses (hereinafter termed "MHPs"), which is an interference waveform due to the self-coupling effect, included in the output voltage of the signal extracting circuit 206; a calculating device 208 for calculating the speed of the object 210; and a display device 209 for displaying the calculation result by the calculating device 208.

Figure 18:
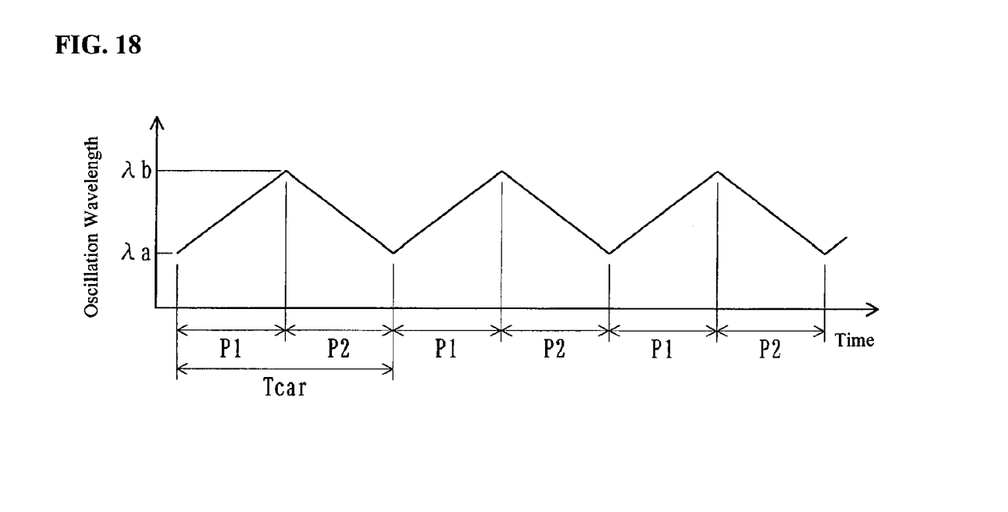
FIG. 18 is a diagram illustrating one example of change over time in the oscillating wavelength of the semiconductor laser in the velocity calculating device of FIG. 17.

The laser driver 204 provides, as a driving current to the semiconductor laser 201, a triangle wave driving current that repetitively increases and decreases at a constant rate of change in respect to time. As a result, the semiconductor laser 201 is driven so as to repetitively alternate between a first emitting interval wherein the oscillating wavelength continuously increases at a constant rate of change, and a second emitting interval wherein the oscillating wavelength is continuously reduced at a constant rate of change. FIG. 18 is a diagram illustrating the changes in the oscillating wavelength of the semiconductor laser 201 over time. In FIG. 18: P1 is the first emitting interval; P2 is the second emitting interval; λa is the minimum value for the oscillating wavelength in each interval; λb is the maximum value for the oscillating wavelength in each interval; and Tcar is the period of the triangle wave.

Figure 17:
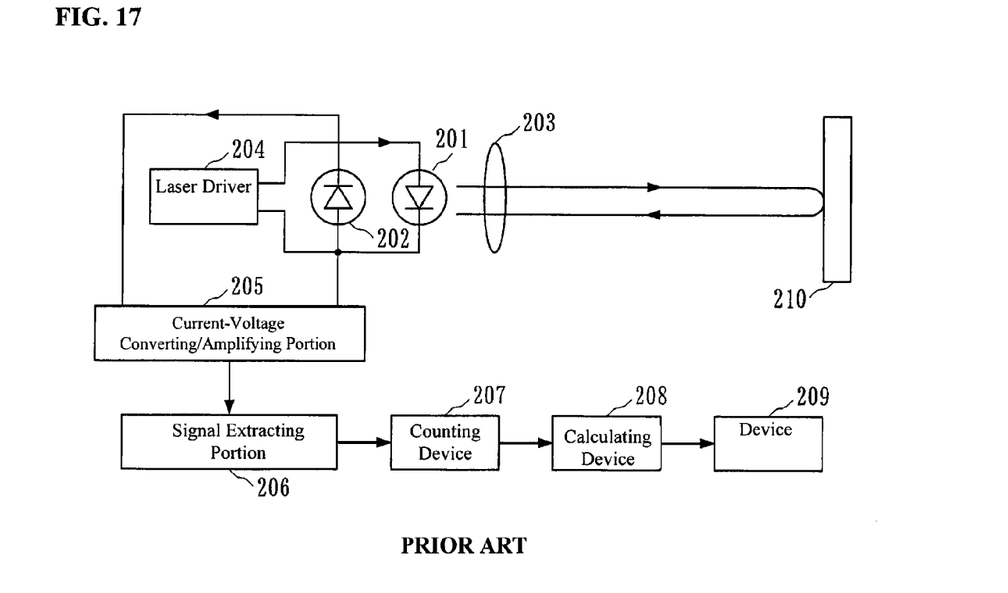
FIG. 17 is a block diagram illustrating the structure of a conventional velocity measuring device.

The beam that is emitted from the semiconductor laser 201 is focused by the lens 203 to be incident on the object 210. The beam that is reflected from the object 210 is focused by the lens 203 to be incident into the semiconductor laser 201. The photodiode 202 converts the output of the semiconductor laser 201 into an electric current. The current-voltage converting/amplifying portion 205 converts the output current from the photodiode 202 into a voltage, and then amplifies that voltage, and the signal extracting circuit 206 removes the emitted waveform (the carrier wave) of the semiconductor laser 201 from the output voltage of the current-voltage converting/amplifying portion 205. The number of MHPs included in the output voltage of the signal extracting circuit 206 is counted by the signal counting device 207 for the first emitting interval P1 and for the second emitting interval P2. The calculating device 208 calculates a physical quantity, such as the velocity of the object 210 based on the minimum oscillating wavelength λa and the maximum oscillating wavelength λb of the semiconductor laser 1 and the number of MHPs in the first emitting interval P1 and the number of MHPs in the second emitting interval P2.

While in the conventional velocity measuring device that uses a triangular carrier wave it is possible to perform calculations separating the interference signal into distance and speed, when compared to a common interferometer that uses a sawtooth carrier wave, there is a problem in that the range of velocity measurement is narrow. This problem area is described below.

The number of MHPs measured by the measuring device is a linear sum of a term N0, which is proportional to the distance L from the object, and a term A·V (where A is a coefficient) that is proportional to the speed of the object, as in the following equation:

$$N=|N0 \pm A \cdot V| \tag{1}$$

Figure 19:
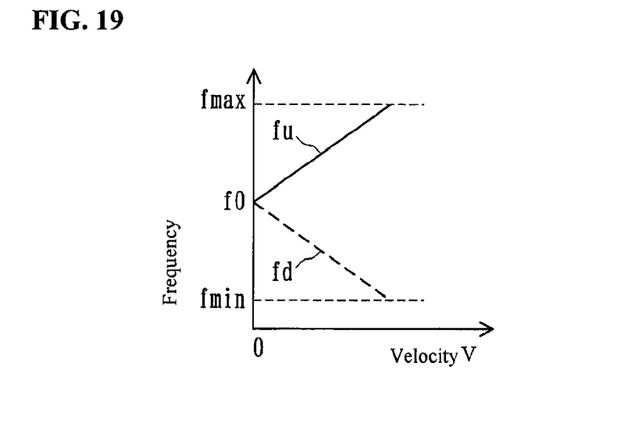
FIG. 19 is a diagram illustrating between the signal frequency and the velocity of the object.

Here the velocity V is positive in the direction that is approaching the semiconductor laser. $N=|N0+A \cdot V|$ during a first emitting interval wherein the oscillating wavelength of the semiconductor laser is increasing, and $N=|N0-A \cdot V|$ during a second emitting interval wherein the oscillating wavelength is decreasing. Moreover, when the relationship in Equation (1) is expressed in terms of the frequency fsig of the MHPs, the result is the following equation:

$$fsig=|f0 \pm a \cdot V| \tag{2}$$

f0 is a term that is proportional to the distance L to the object, and a is a coefficient. The relationship between the MHP frequency fsig and the velocity V of the object is illustrated in FIG. 19. In FIG. 19, fu indicates the change in the frequency fig in the first emitting interval wherein the oscillating wavelength of the semiconductor laser is increasing, and fd indicates the change in the frequency fig in the second emitting interval wherein the oscillating wavelength is decreasing. fmax is the maximum frequency of the MHPs that can be extracted by the signal extracting circuit 206, and fmin is the minimum frequency of the MHPs that can be extracted by the signal extracting circuit 206. The difference between fmax and fmin is the circuit bandwidth.

Figure 20:
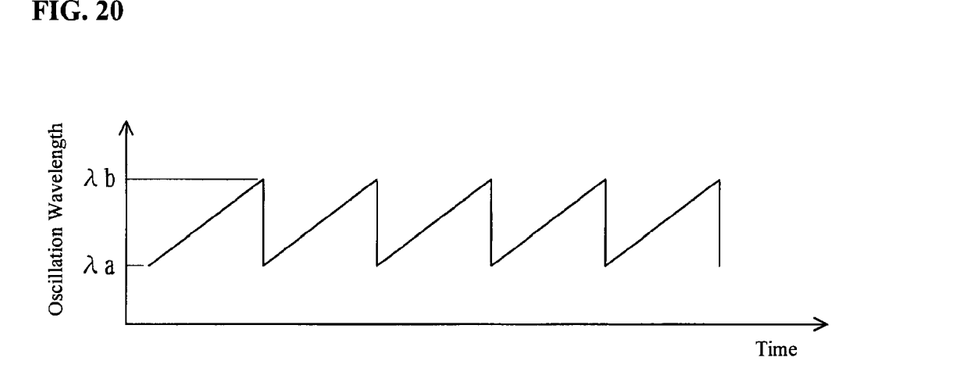
FIG. 20 is a diagram illustrating the changes in the oscillating wavelength in the case of oscillating the semiconductor laser in a sawtooth wave.

As described above, in a velocity measuring device that uses the triangular carrier wave, the signs of the coefficients relating to the velocities V of the object are different during the first emitting interval and the second emitting interval. Because of this, as illustrated in FIG. 20, wherein the semiconductor laser is caused to oscillate in a sawtooth wave, as illustrated in FIG. 20, the circuit bandwidth they can be used in counting the MHPs is half as large, and as a result, the circuit bandwidth they can be used in the velocity measurement is half as large. Note that the problem set forth above is not limited to self coupling-type velocity measuring devices, but occurs similarly in a velocity measuring device that uses a triangular carrier wave.

On the other hand, in a velocity measuring device that uses the sawtooth carrier wave, illustrated in FIG. 20, it is possible to double the range of measurement of velocities when compared to the velocity measuring device that uses the triangular carrier wave. However, in the MHPs counted by the measuring device, it is not possible to separate those MHPs due to the distance from the object from the MHPs due to the speed of the object. The result is a problem in that there will be error in the speed that is calculated by the calculating device.

The present invention is to solve the problem set forth above, and the object is to provide a velocity measuring device and method able to increase the range of measurement of velocity while maintaining the benefits of a velocity measuring device that uses a triangular carrier wave.

SUMMARY

A velocity measuring device as set forth in the example of the present invention has an emitting device for emitting an electromagnetic wave or an elastic wave toward a measurement object; oscillating wavelength modulating means for causing the emitting device to operate so as to alternatingly be in a first emitting interval wherein the oscillating wavelength continuously increases monotonically and a second emitting interval wherein the oscillating wavelength continuously decreases monotonically; detecting means for detecting an electric signal that includes an interference waveform that is produced by the electromagnetic wave or elastic wave that is emitted from the emitting device and a reflected wave that is returned from the measurement object; signal extracting means for calculating the number of interference waveforms included in the output signal of the detecting means during the first emitting interval and the second emitting interval; and calculating means for calculating the velocity of measurement object based on a number of interference waveforms; wherein: the oscillating wavelength modulating means cause the emitting device to operate so that the absolute values of the rates of change of the oscillating wavelengths in respect to time during the first emitting interval and the second emitting interval is be different, wherein, if fmax is the maximum frequency of an interference waveform that can be extracted by the signal extracting means, fmin is the minimum frequency of an interference waveform that can be measured, T1 is the length of time of the first emitting interval, and T2 is the length of time of the second emitting interval P2, then (fmin/fmax)≥(T2/T1) when the measurement object moves toward the emitting device, and (fmin/fmax)≥(T1/T2) when the measurement object moves away from the emitting device.

One structural example of the velocity measuring device as set forth in an example includes: frequency measuring means for measuring respective average frequencies of the interference waveforms in the first emitting interval and in the second emitting interval; and carrier wave adjusting means for adjusting a carrier wave for oscillating wavelength modulation of the emitting device so that the average value of the average frequency of the interference waveform in the first emitting interval and the average frequency of the interference waveform in the second oscillating frequency is equal to the average value of the maximum frequency of the interference waveform that can be extracted by the signal extracting means and the minimum frequency of the interference waveform that can be measured.

Moreover, one structural example of a velocity measuring device according to the present invention further comprises: carrier wave adjusting means for adjusting a carrier wave for oscillating wavelength modulation of the emitting device so that the frequency of the interference waveform in the first emitting interval when the velocity of the measurement object is 0 can approach the minimum frequency in a range that does not fall below the minimum frequency of the interference waveform that can be extracted by the signal extracting means, and the frequency of the interference waveform in the second emitting interval when the velocity of the measurement object is 0 can approach the maximum frequency in a range that does not exceed the maximum frequency of the interference waveform that can be extracted by the signal extracting means.

Moreover, in one structural example of a velocity measuring device according to an example the emitting device is a semiconductor laser; and the detecting step detects an electric signal that includes an interference waveform that is produced through a self-coupled effect between a laser beam that is an electromagnetic wave that is emitted from the semiconductor laser and a return beam that is a reflected wave that returns from the measurement object.

A velocity measuring method has an oscillating step for causing an emitting device to operate so as to alternatingly be in a first emitting interval wherein the oscillating wavelength continuously increases monotonically and a second emitting interval wherein the oscillating wavelength continuously decreases monotonically; a detecting step for detecting an electric signal that includes an interference waveform that is produced by the electromagnetic wave or elastic wave that is emitted from the emitting device and a reflected wave that is returned from a measurement object; a signal extracting step for calculating the number of interference waveforms obtained during the first emitting interval and the second emitting interval; and a calculating step for calculating the velocity of measurement object based on a number of interference waveforms; wherein: the oscillating wavelength modulating step causes the emitting device to operate so that the absolute values of the rates of change of the oscillating wavelengths in respect to time during the first emitting interval and the second emitting interval can be different, wherein, if fmax is the maximum frequency of an interference waveform that can be measured, fmin is the minimum frequency of an interference waveform that can be measured, T1 is the length of time of the first emitting interval, and T2 is the length of time of the second emitting interval P2, then (fmin/fmax)≥(T2/T1) when the measurement object moves toward the emitting device, and (fmin/fmax)≥(T1/T2) when the measurement object moves away from the emitting device.

The present invention makes it possible to perform accounting of interference waveforms using essentially the entire circuit bandwidth in the velocity measuring device in both the first emitting interval and the second emitting interval through operating an emitting device so that the absolute values of the rates of change of the oscillating frequency wavelengths in respect to time can be different during the first emitting interval and the second emitting interval enabling the circuit bandwidth to be used more efficiently than in the past, to enable the range of measurement of the velocities to be increased.

DETAILED DESCRIPTION

Figure 1:
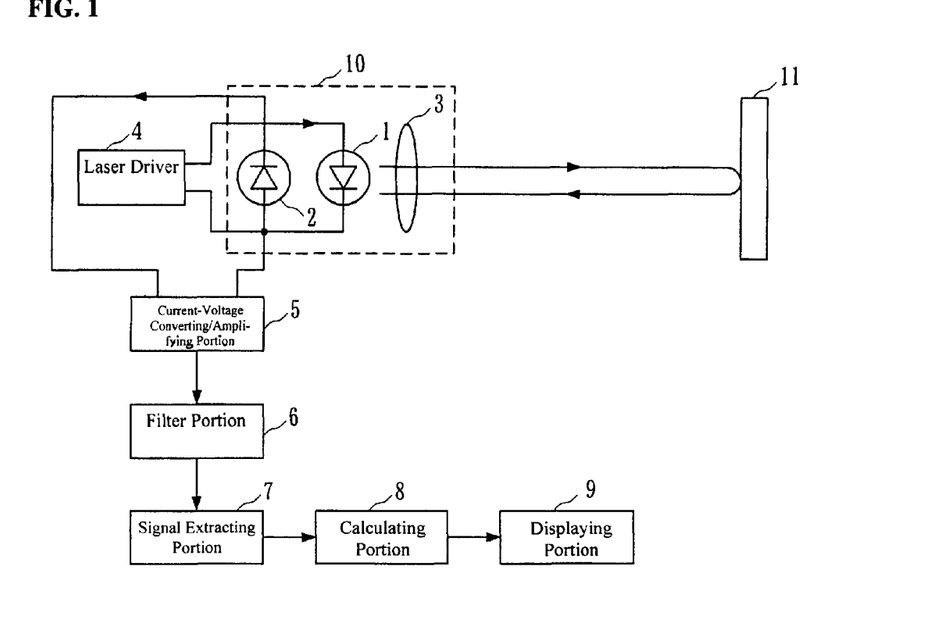
FIG. 1 is a block diagram illustrating the structure of a velocity measuring device according to an example.

Examples for carrying out the present invention are explained below in reference to the figures. FIG. 1 is a block diagram illustrating a structure for a velocity measuring device. The velocity measuring device in FIG. 1 includes a semiconductor laser 1 that is an emitting device for emitting a laser beam at an object (hereinafter termed a web) such as paper, film, cellophane, metal foil, rubber, or the like, that is coiled in the shape of a roll; a photodiode 2 for converting the optical power of the semiconductor laser 1 into an electric signal; a lens 3 for focusing and emitting light from the semiconductor laser 1, and for focusing and injecting into the semiconductor laser 1 the return light from the web 11; a laser driver 4 that serves as oscillating wavelength modulating means for driving the semiconductor laser 1; a current-voltage converting/amplifying portion 5 for converting the output current from the photodiode 2 into a voltage and for amplifying that voltage; a filter portion 6 for eliminating the carrier wave from the output voltage of the current-voltage converting/amplifying portion 5; a signal extracting portion 7 for counting the number of MHPs that are the self-coupled signals that are included in the output voltage of the filter portion 6; a calculating portion 8 for calculating the velocity of the web 11 based on the number of MHPs derived by the signal extracting portion 7; and a displaying portion 9 for displaying the measurement result of the calculating portion 8.

Additionally, the photodiode 2 and the current-voltage converting/amplifying portion 5 structure detecting means. The semiconductor laser 1, the photodiode 2, and the lens 3 structure a sensor module 10.

Figure 2:
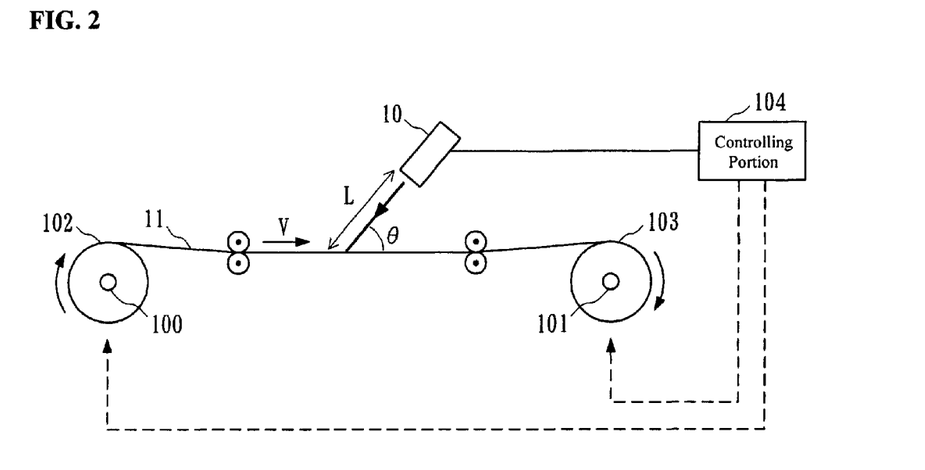
FIG. 2 is a block diagram illustrating the structure of a web conveying device to which is applied the velocity measuring device according to the above example.

FIG. 2 is a block diagram illustrating the structure of a web conveying device to which is applied the velocity measuring device. The web conveying device has a sending-side guide shaft 100; a receiving-side guide shaft 101; a sending-side roll 102 that is equipped on the sending-side guide shaft 100; a receiving-side roll 103 that is equipped on the receiving-side guide shaft 101; a sending-side motor driving portion (not shown) for driving the sending-side guide shaft 100 to rotate the sending-side roll 102; a receiving-side motor driving portion (not shown) for driving the receiving-side guide shaft 101 to rotate the receiving-side roll 103; and a controlling portion 104 for controlling the sending-side motor driving portion and the receiving-side motor driving portion.

When the sending-side motor driving portion rotates the sending-side roll 102, the web 11 that is wrapped onto the sending-side roll 102 is fed out. On the receiving side, the receiving-side roll 103 takes up the web 11 by the receiving-side motor driving portion rotating the receiving-side roll 103.

The controlling portion 104 controls the sending-side motor driving portion and the receiving-side motor driving portion in order to cause the velocity of the web 11 to have a desired value.

The sensor module 10 that includes the semiconductor laser 1, the photodiode 2, and the lens 3 is disposed on the web 11 between the sending-side guide shaft 100 and the receiving-side guide shaft 101, as illustrated in FIG. 2, to cause oblique incidence of the laser beam onto the web 11. The oblique incidence of the laser beam is in order to measure the velocity of the web 11.

The laser driver 4, the current-voltage converting/amplifying portion 5, the filter portion 6, the signal extracting portion 7, the calculating portion 8, and the displaying portion 9 in FIG. 1 are provided within the controlling portion 104.

The operation of the velocity measuring device according to the examples is explained in detail next. For ease in the explanation, it shall be envisioned below that the semiconductor laser 1 that is used is not of the type that has a mode-hopping phenomenon (the VCSEL type or the DFB laser type).

Figure 3:
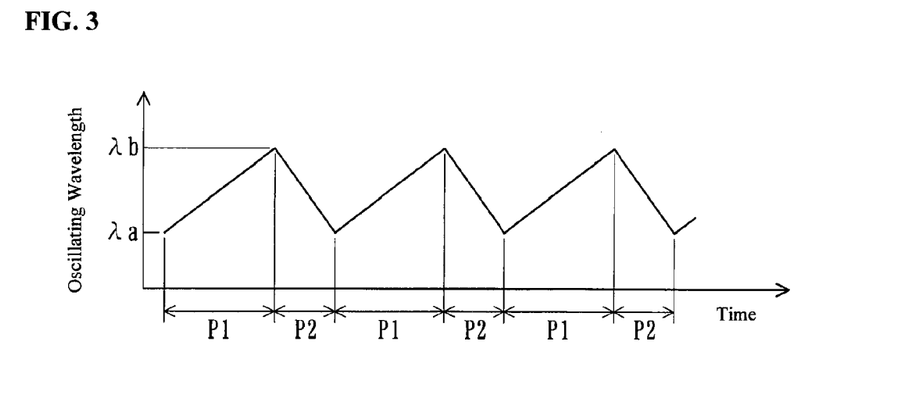
FIG. 3 is a diagram illustrating one example of change over time in the oscillating wavelength of the semiconductor laser.

The laser driver 4 provides, as injection currents to the semiconductor laser 1, triangle-wave driving currents having different absolute values for the rates of change of the oscillating wavelengths, in respect to time, during a first emitting interval wherein the oscillating wavelength of the semiconductor laser is increasing and during a second emitting interval wherein the oscillating wavelength is decreasing. The semiconductor laser 1 is driven thereby so as to repetitively alternate between the first emitting interval and the second emitting interval. FIG. 3 is a diagram illustrating the changes in the oscillating wavelength of the semiconductor laser 1 over time. In FIG. 3: P1 is the first emitting interval; P2 is the second emitting interval; $\lambda a$ is the minimum value for the oscillating wavelength in each interval; and $\lambda b$ is the maximum value for the oscillating wavelength in each interval. In the present form of embodiment, the maximum value $\lambda b$ of the oscillating wavelength and the minimum value $\lambda a$ of the oscillating wavelength are both always constant, so the difference λb−λa thereof is also always a constant.

When the web 11 is moving in the horizontal direction so as to approach the semiconductor laser 1, as illustrated in FIG. 2, the following equation is satisfied if fmax is the maximum frequency of the MHPs that can be extracted by the signal extracting portion 7, fmin is the minimum frequency of MHPs that can be measured, T1 is the length of the first emitting interval P1, and T2 is the length of the second emitting interval P2:

$$(fmin/fmax) \geq (T2/T1) \quad (3)$$

When Equation (3) is expressed in terms of the slopes of the oscillating wavelength, with S1 as the slope of the oscillating wavelength during the first emitting interval P1 and S2 as the slope of the oscillating wavelength during the first emitting interval P2, the result is the following equation:

$$(fmin/fmax) \leq (S1/S2) \quad (4)$$

Moreover, in the opposite of the case in FIG. 2, the following equation is fulfilled when the web 11 is moving in the direction away from the semiconductor laser 1 along the horizontal direction:

$$(fmin/fmax) \geq (T1/T2) \quad (5)$$

Expressing Equation (5) in terms of the slope of the oscillating wavelength results in the following equation:

$$(fmin/fmax) \geq (S2/S1) \quad (6)$$

In this way, the laser driver 4 provides, as the injection current into the semiconductor laser 1, a triangle wave driving current defined by any of Equation (3) through (6).

The beam that is emitted from the semiconductor laser 1 is focused by the lens 3 to be incident on the web 11. A portion of the beam that is reflected from the web 11 is focused by the lens 3 to be incident on the semiconductor laser 1. Note that the focusing by the lens 3 is not absolutely necessary. The photodiode 2 is disposed within or in the vicinity of the semiconductor laser 1, and converts the optical power from the semiconductor laser 1 into an electric current. The current-voltage converting/amplifying portion 5 converts the output current from the photodiode 2 into a voltage, and then amplifies that voltage.

Figure 4:
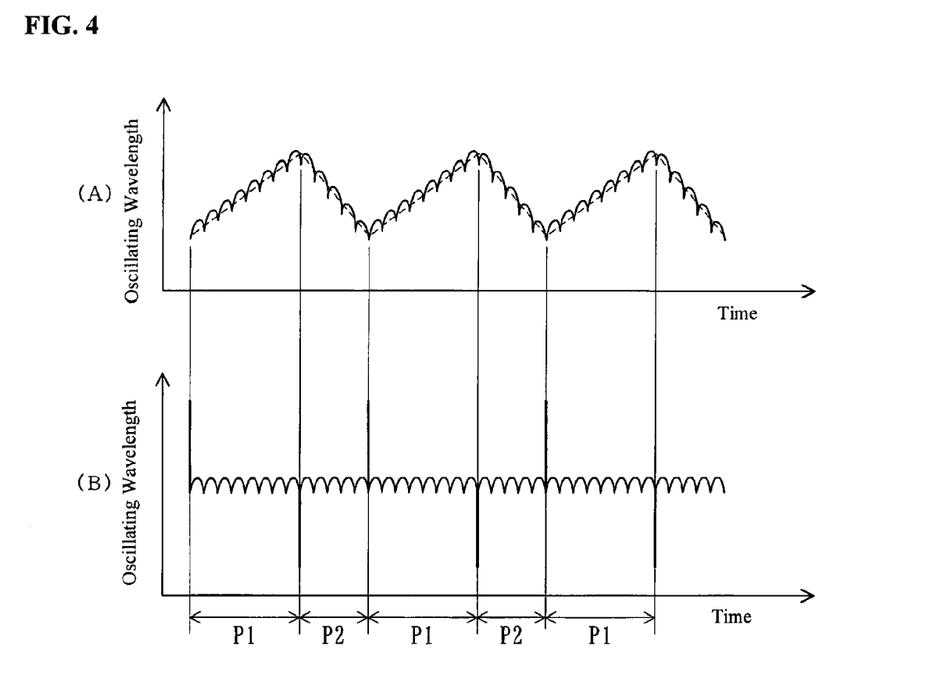
FIG. 4 is a waveform diagram illustrating schematically an output voltage waveform of a current-voltage converting/amplifying portion and an output voltage waveform of a filter portion in the above example.

The filter portion 6 has the function of extracting a superimposed signal from a modulated wave. FIG. 4 (A) is a diagram illustrating schematically the output voltage waveform of the current-voltage converting/amplifying portion 5, and FIG. 4 (B) is a diagram illustrating schematically the output voltage waveform of the filter portion 6. These diagrams illustrate the progression of the waveform (the modulated wave) of FIG. 4 (A), which corresponds to the output of the photodiode 2, to the removal of the emitted waveform (the carrier wave) from the semiconductor laser 1 in FIG. 3, to the extraction of the MHP waveform (the interference waveform) of FIG. 4 (B).

Figure 5:
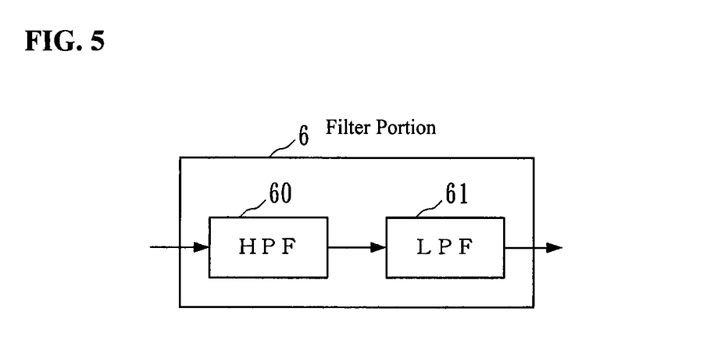
FIG. 5 is a diagram illustrating an example of the structure of a filter portion of velocity measuring device.

The structure of the filter portion (6) are described below. The filter portion (6), as illustrated in FIG. 5, is structured from a high-pass filter 60, for removing the carrier wave, and a low-pass filter 61, for removing the noise. The maximum frequency fmax of the MHPs that can be extracted by the signal extracting portion 7 is determined by the cutoff frequency of the low-pass filter 61, and the minimum frequency fmin of the MHPs that can be extracted by the signal extracting portion 7 is determined by the cutoff frequency of the high-pass filter 60.

Following this, the number of MHPs included in the output voltage from the filter portion 6 is counted by the signal extracting portion 7 for the first emitting interval P1 and for the second emitting interval P2. A counter comprising logic gates may be used as the signal extracting portion 7. Moreover, the frequency of the MHPs (that is, the number of MHPs per unit time) may be calculated using a frequency analyzing technique such as FFT (Fast Fourier Transform), and the number of MHPs during a signal extracting interval may be calculated.

Figure 6:
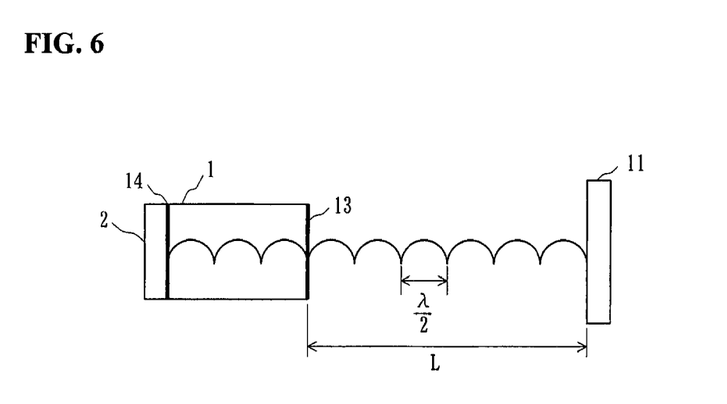
FIG. 6 is a diagram for explaining the mode hop pulse.

Here an explanation is given regarding the MHPs, which are self-coupled signals. As illustrated in FIG. 6, when the distance from a mirror layer 13 to the web 11 is defined as L and the oscillating wavelength of the laser is defined as λ, and the oscillating conditions set forth below are fulfilled, then there is a reinforcing interaction between the return beam from the web 11 and the laser beam within the optical resonator of the semiconductor laser 1, to slightly increase the laser power $$L = q\lambda/2 \quad (7)$$

In Equation (7) q is an integer. This phenomenon can be fully observed because an amplifying effect is produced through the increase in apparent reflectance within the oscillator of the semiconductor laser 1, even if the scattered beam from the web 11 is extremely slight. Note that in FIG. 6, 14 is a dielectric multilayer that serves as a mirror.

Figure 7:
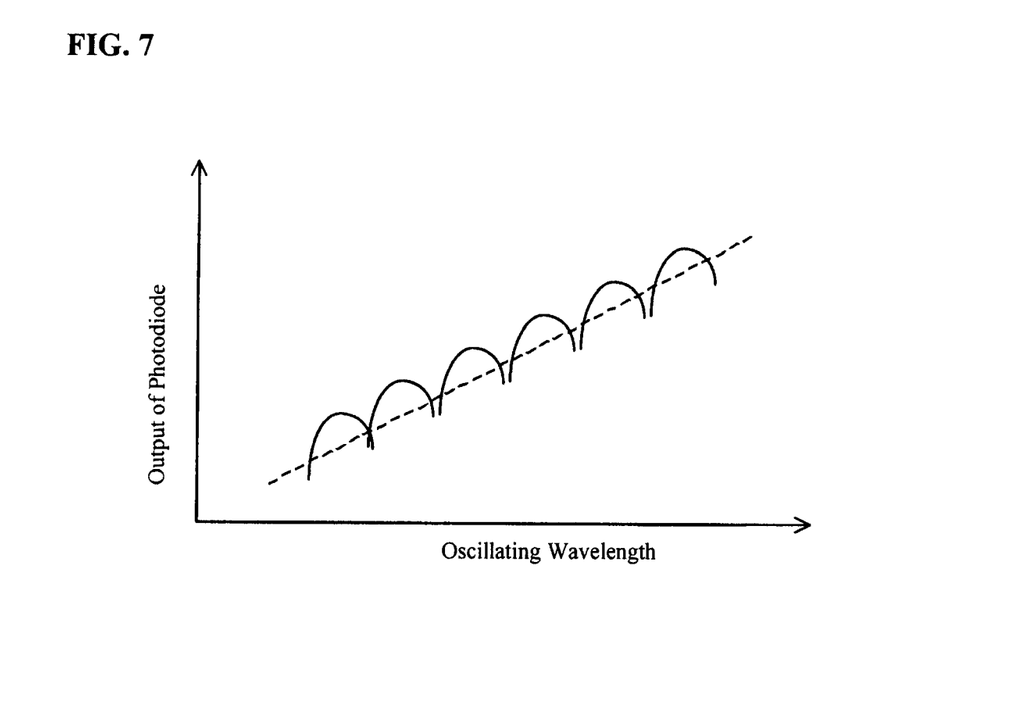
FIG. 7 is a diagram illustrating the relationship between the oscillating wavelength of the semiconductor laser and the output waveform of a photodiode.

FIG. 7 is a diagram illustrating the relationship between the oscillating wavelength of the semiconductor laser and the output waveform of a photodiode. When $L=q\lambda/2$ indicated in Equation (7), is satisfied, then the phase difference between the return beam and the laser beam within the optical resonator can go to 0° (in-phase), so that the return beam and the laser beam within the optical resonator can maximally intensify each other, and when $L=q\lambda/2+\lambda/4$, then the phase difference can be 180° (anti-phase), so the return beam and the laser beam within the optical resonator can maximally weaken each other. Because of this, when the oscillating wavelength of the semiconductor laser 1 is varied, places wherein the laser power is strong and places wherein the laser power is weak can alternatingly appear repetitively, and if the laser power at this time is detected by the photodiode 2, then, as illustrated in FIG. 7, a waveform that has a stair step shape can be produced with a constant period. This type of waveform is commonly known as interference fringes. Each step-shape waveform, that is, each individual interference fringe, is an MHP. As described above, when the oscillating wavelength of the semiconductor laser 1 is varied, the number of MHPs in a constant interval can vary proportionally to the measurement distance. Moreover, when the web 11 has a velocity, there can be an increase in the number of MHPs that is proportional to that velocity, due to the Doppler effect component.

Figure 8:
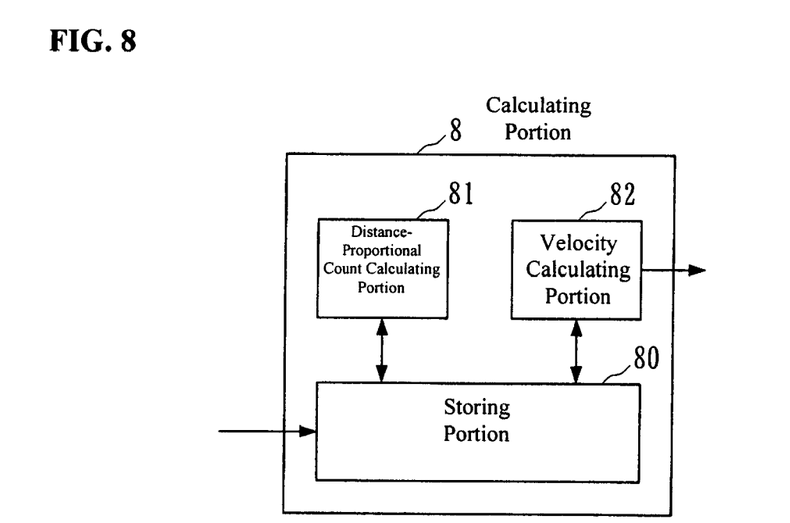
FIG. 8 is a block diagram illustrating one example of a structure of a calculating portion of the velocity measuring device in the above example.

The calculating portion 8 then calculates the velocity of the web 11 based on the number of MHPs counted by the signal extracting portion 7. FIG. 8 is a block diagram illustrating one example of a structure for a calculating portion 8. The calculating portion 8 is structured from: a storing portion 80 for storing, for example, the number of MHPs derived by the signal extracting portion 7; a distance-proportional count calculating portion 81 for calculating a number of MHPs (hereinafter termed the "distance-proportional count) that is proportional to the average distance between the semiconductor laser 1 and the web 11; and a velocity calculating portion 82 for calculating the velocity of the web 11 from the distance-proportional count NL.

Figure 9:
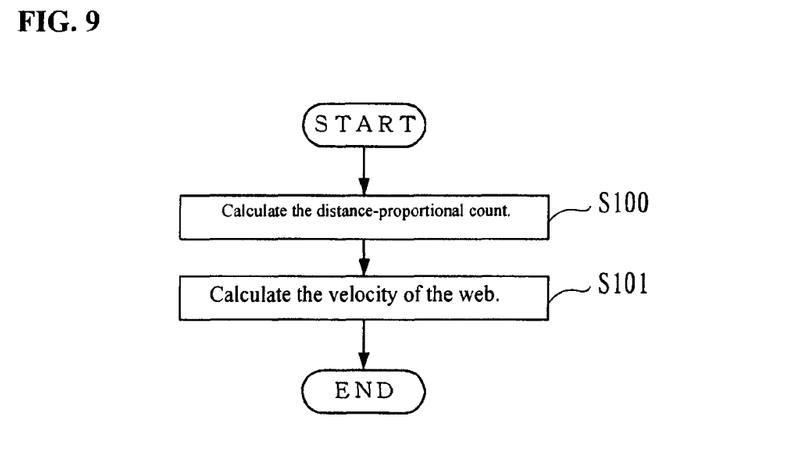
FIG. 9 is a flowchart illustrating the operation of the calculating portion of the velocity measuring device according to the above example.

FIG. 9 is a flowchart illustrating the operation of the calculating portion 8. The number of MHPs derived by the signal extracting portion 7 is stored in the storing portion 80 of the calculating portion 8.

Figure 10:
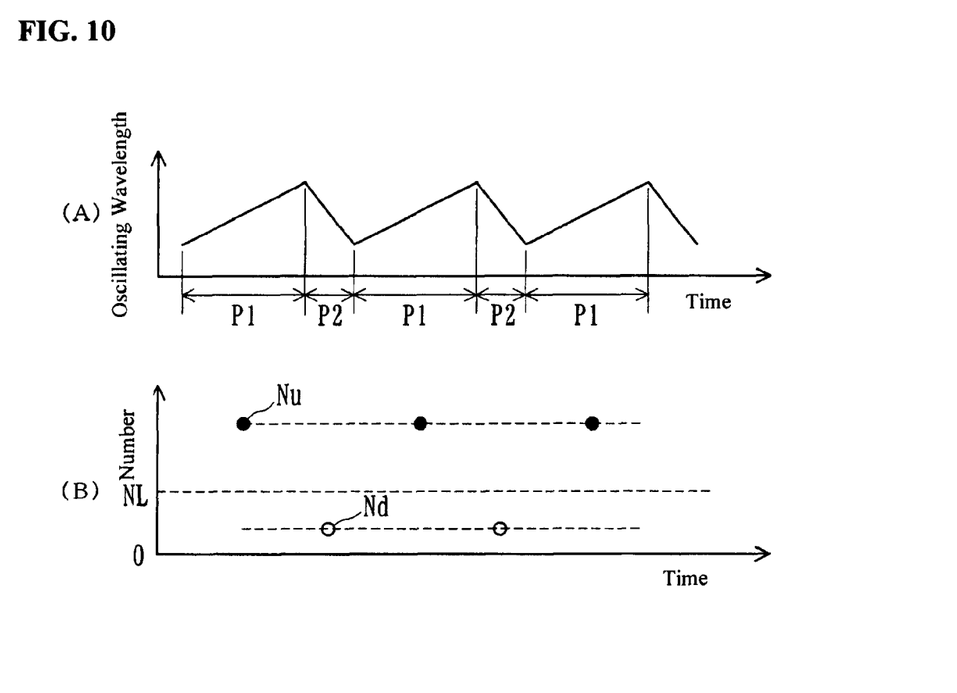
FIG. 10 is a diagram illustrating of change over time in the oscillating wavelength of the semiconductor laser, and the change over time in the number of mode hops derived by the signal extracting portion.

FIG. 10 (A) is a diagram illustrating the change over time in the oscillating wavelength of the semiconductor laser 1, and FIG. 10 (B) is a diagram illustrating the change over time in the number of MHPs derived by the signal extracting portion 7. In FIG. 10 (B), Nu is the number of MHPs during the first emitting interval P1, Nd is the number of MHPs during the second emitting interval P2, and NL is the distance-proportional count. As is clear from FIG. 3, the first emitting interval P1 and the second emitting interval P2 are encountered alternatingly, and thus the numbers of MHPs Nu and Nd also appear alternatingly.

The distance-proportional count calculating portion 81 of the calculating portion 8 calculates the distance-proportional count NL from the numbers of MHPs stored in the storing portion 80 (Step S100 in FIG. 9).

As is clear from FIG. 10(A), the first emitting interval P1 and the second emitting interval P2 are encountered alternatingly, and thus the numbers of MHPs Nu and Nd also appear alternatingly. The numbers of MHPs Nu and Nd are the sums or differences of the distance-proportional count NL and the numbers of MHPs that are proportional to the dislocations of the web during the measurement intervals T1 or T2.

The distance-proportional count calculating portion 81 calculates the distance-proportional count NL as shown in the following equation:

$$NL=(T1 \times Nd+T2 \times Nu)/(T1+T2) \quad (8)$$

In Equation (8), T1 is the duration of the first emitting interval P1, and T2 is the duration of the first emitting interval P2. The distance-proportional count NL, calculated by the distance-proportional count calculating portion 81, is stored in the storing portion 80. The distance-proportional count calculating portion 81 performs the process for calculating the distance-proportional count NL, as described above, at each time mark wherein the number of MHPs is measured by the signal extracting portion 7 (that is, with each emitting interval). Note that the calculating process for the distance-proportional count NL may use the respective average values for the Nd and Nu for a given interval, instead of the Nd and Nu of Equation (8), in addition to each of the emitting intervals.

Next the velocity calculating portion 82 of the calculating portion 8 calculates the velocity V of the web 11 from the distance-proportional count NL (Step S101 in FIG. 9). Because the differences between the numbers of MHPs derived by the signal extracting portion 7 (namely Nu and Nd) and the distance-proportional count NL is proportional to the dislocation during the measuring interval, the dislocation D in the direction of progress of the web 11 during the time interval T1 of the first emitting interval P1 or during the time interval T2 of the second emitting interval P2 can be calculated by the following equation:

$$D=\lambda/2 \times |N-NL| \times \cos\theta \quad (9)$$

In Equation (9): λ is the average wavelength of oscillation of the semiconductor laser 1; and θ Is the angle formed by the optical axis of the laser beam from the semiconductor laser 1 relative to the web 11, as illustrated in FIG. 2. From Equation (9), the velocity V of the web 11 in the first emitting interval P1 can be calculated using the following equation.

$$V=D/T1 \quad (10)$$

Moreover, the velocity V of the web 11 in the second emitting interval P2 can be calculated using the following equation.

$$V=D/T2 \quad (11)$$

The velocity calculating portion 82 performs the process for calculating the velocity V using Equation (10) at each time mark whereat the number of MHPs is measured by the signal extracting portion 7 (with each emitting interval). Note that the displacement D in Equation (10) is the value that is calculated using Nu as the number N for the MHPs in Equation (9), and the displacement D in Equation (11) is calculated using Nd as the number N for the MHPs in Equation (9). Note that both the velocity V and the displacement D are positive in the direction that is approaching the semiconductor laser. The displaying portion 9 displays the velocity V of the web 11, calculated by the velocity calculating portion 82.

The controlling portion 104 of the web conveying device controls the sending-side motor driving portion and the receiving-side motor driving portion based on the results of calculation by the velocity calculating portion 82, so that the velocity V of the web 11 can go to a specific number. Note that because this is not a structural element of the example, there is no description of means for calculating the tension of the web 11; however, the tension on the web 11 may be measured through a well-known technology, and, of course, the sending-side motor driving portion and the receiving-side motor driving portion may be controlled so that the tension on the web 11 can go to a desired value.

Figure 11:
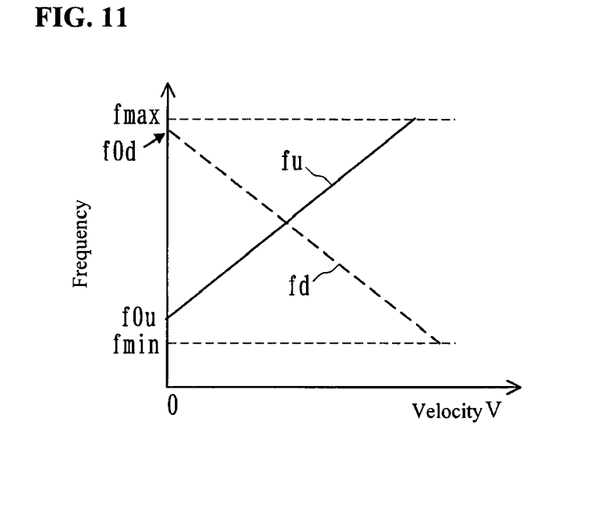
FIG. 11 is a diagram illustrating the relationship between the signal frequency and the velocity of the object.
Figure 12:
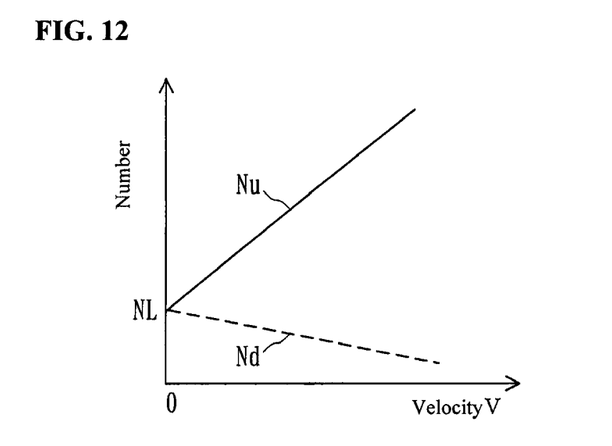
FIG. 12 is a diagram illustrating the relationship between the number of mode hops derived by the signal extracting portion and the velocity of the object.

FIG. 11 is a diagram illustrating the relationship between the signal frequency and fsig of the MHPs and the velocity V of the web 11 in a form of embodiment according to the present invention, and FIG. 12 is a diagram illustrating the relationship between the number N of MHPs derived by the signal extracting portion 7 and the velocity V of the web 11. In FIG. 11, fu indicates the change in the frequency fig in the first emitting interval wherein the oscillating wavelength of the semiconductor laser is increasing, and fd indicates the change in the frequency fig in the second emitting interval wherein the oscillating wavelength is decreasing.

As illustrated in FIG. 19, in the conventional velocity measuring device the bandwidths that can be used in counting the MHPs during the first emitting interval and during the second emitting interval, respectively, are one half of the circuit bandwidth of the velocity measuring device. In contrast, in the present example, the carrier waves used during the first emitting interval and during the second emitting interval have different absolute values for the rates of change, in respect to time, of the oscillating wavelengths thereof. As a result, in the present example, as illustrated in FIG. 11, it is possible to count the MHPs using essentially the entirety of the circuit bandwidth in the velocity measuring device in both the first emitting interval and the second emitting interval, thereby enabling an increase in the range of measurement of velocities.

Figure 13:
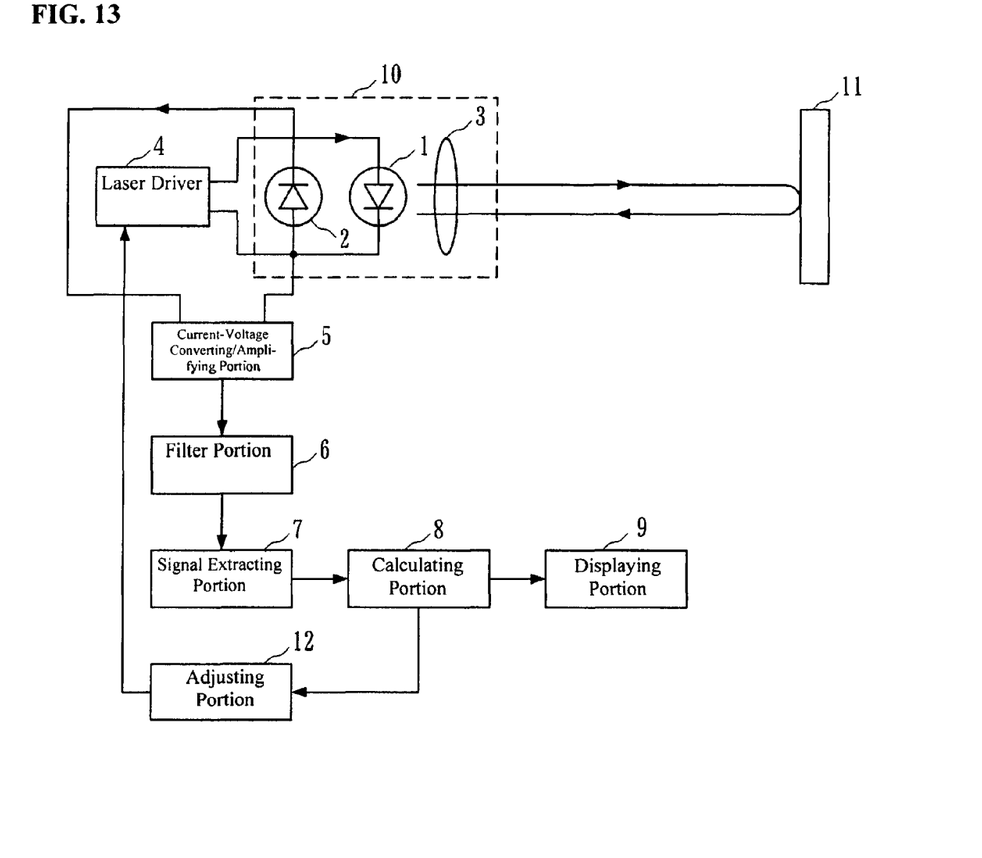
FIG. 13 is a block diagram illustrating a structure for a velocity measuring device according to another embodiment.

Another example according to the present invention is explained next. FIG. 13 is a block diagram illustrating the structure of a velocity measuring device, and identical codes are assigned to structures that are identical to those in FIG. 1. The velocity measuring device according to this example includes a semiconductor laser 1; a photodiode 2; a lens 3; a laser driver 4; a current-voltage converting/amplifying portion 5; a filter portion 6, a signal extracting portion 7, a calculating portion 8, a displaying portion 9, and an adjusting portion 12 for adjusting the carrier wave.

Figure 14:
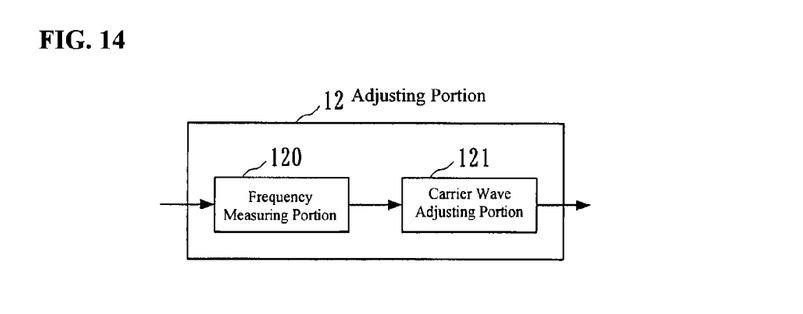
FIG. 14 is a block diagram illustrating one example of a structure of an adjusting portion of the velocity measuring device in the above embodiment.

FIG. 14 is a block diagram illustrating one example of a structure for an adjusting portion 12. The adjusting portion 12 is structured from a frequency measuring portion 120 and a carrier wave adjusting portion 121.

The frequency measuring portion 120 measures the respective average frequencies fav of the MHPs during the first emitting interval wherein the oscillating wavelength of the semiconductor laser 1 is increasing and during the second emitting interval wherein the oscillating wavelength is decreasing. The frequency measuring portion 120 calculates, as shown in the equation below, the average frequency fav of the MHPs from the number N of MHPs extracted by the signal extracting portion 7 and the signal extracting time T over which the signal extracting portion 7 counted the number of MHPs. Note that the average frequency FAV of the MHPs may instead be calculated using frequency analyzing means such as FFT, or the like.

$$fav = N/T \quad (12)$$

The carrier wave adjusting portion 121 adjusts the carrier wave, through the laser driver 4, so that the average value of the average frequency fu of the MHPs during the first emitting interval and the average frequency fd of the MHPs during the second emitting interval can be equal to the average value of the maximum frequency fmax for the MHPs that can be extracted by the signal extracting portion 7 and the minimum frequency fmin for the MHPs that can be measured. That is, the carrier wave adjusting portion 121 adjusts the carrier wave so as to satisfy the following equation:

$$(fu \pm fd)/2 = (fmax + fmin)/2 \quad (13)$$

Specifically, the carrier wave adjusting portion 121 adjusts the carrier wave through varying the frequency of the carrier wave, the rate of change of the oscillating frequency in respect to time, and/or the difference Δλ between the maximum oscillating wavelength λb and the minimum oscillated wavelength λa. Any of these adjustments can be achieved through adjusting the triangle wave driving current supplied to the semiconductor laser 1 from the laser drivers 4.

The adjustment of the carrier wave as described above may be performed at the time of the initial setup when the web 11 is not moving, or may be performed at any time while measuring the velocity of the web 11. The other structures of the velocity measuring device are identical to the structures above.

In the above examples, preferably Equation (13) is fulfilled in order to use the circuit bandwidth of the velocity measuring device with maximum efficiency. In the present example, it is possible to use the circuit bandwidth of the velocity measuring device effectively through adjusting the carrier wave, making it possible to expand the range of measurement of velocities.

Figure 15:
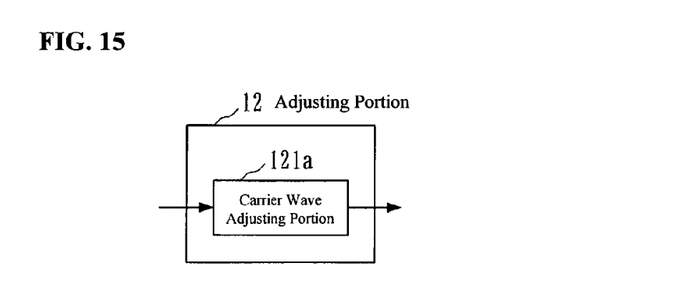
FIG. 15 is a block diagram illustrating one example of a structure of an adjusting portion of the velocity measuring device in a further embodiment.

Yet another example is explained next. The present example illustrates another structure for the adjusting portion 12 of the above examples. FIG. 15 is a block diagram illustrating one example of a structure for an adjusting portion 12 The adjusting portion 12 in the present example is structured from a carrier wave adjusting portion 121a.

When, in FIG. 11, the slope of the frequency fu is a, the slope of the frequency fd is −a, the intercept of the frequency fu is f0u, and the intercept of the frequency fd is f0d, and, in FIG. 12, the slope of the number Nu is Au and the slope of the number Nd is Ad, the following equations are fulfilled:

$$fu = f0u + a \times V \quad (14)$$

$$fd = f0d - a \times V \quad (15)$$

$$Nu = NL + Au \times V \quad (16)$$

$$Nd = NL + Ad \times V \quad (17)$$

The carrier wave adjusting portion 121a adjusts the carrier wave, through the laser driver 4, so that the intercept f0u, that is, the frequency of MHPs during the first emitting interval when the velocity V of the web 11 is 0, approaches fmin in a range that does not fall below the minimum frequency fmin, and so that the intercept f0d, that is, the frequency of MHPs during the second emitting interval when the velocity V of the web 11 is 0, approaches fmax in a range that does not exceed the maximum frequency fmax. This can produce effects identical to those above.

Figure 16:
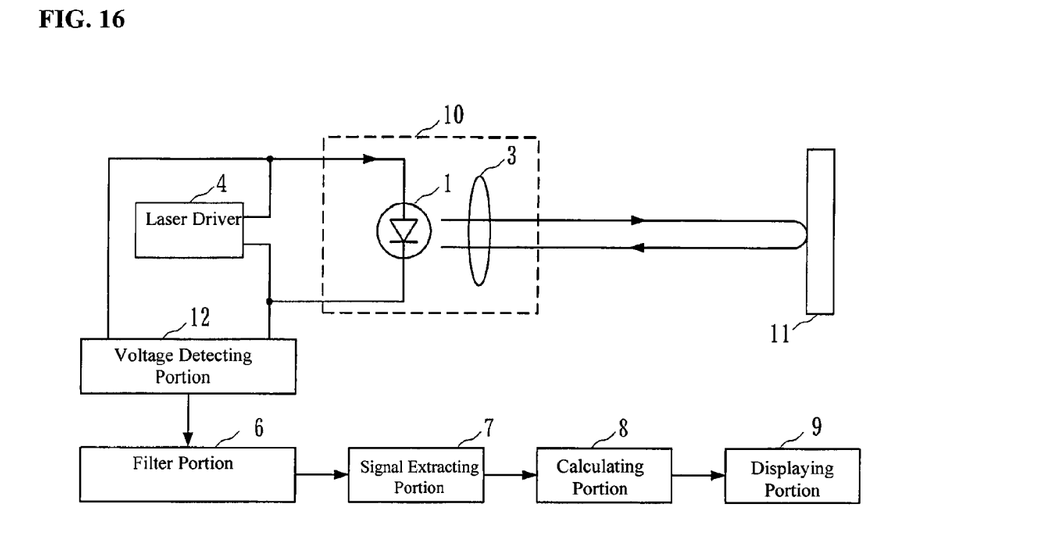
FIG. 16 is a block diagram illustrating a structure for a velocity measuring device according to yet another example.

A further example is explained next. While in the above examples, a photodiode 2 and a current-voltage converting/amplifying portion 5 were used as the detecting means for detecting the electric signal that includes the MHP waveform, it is possible to detect the MHP waveform without using a photodiode. FIG. 16 is a block diagram illustrating the structure of a velocity measuring device according to this example, and identical codes are assigned to structures that are identical to those in FIG. 1. The velocity measuring device according to the present example uses a voltage detecting portion 13 as the detecting portion, instead of the photodiode 2 and the current-voltage converting/amplifying portion 5 of the above.

The voltage detecting portion 13 detects and amplifies the voltage between the terminals of the semiconductor laser 1, or in other words, detects the voltage between the anode and the cathode thereof. When interference occurs between the laser beam that is emitted from the semiconductor laser 1 and the beam that returns from the web 11, MHP waveforms appear in the voltage between the terminals of the semiconductor laser 1. Consequently, it is possible to extract the MHP waveforms from the voltage between the terminals of the semiconductor laser 1.

The filter portion 6 removes the carrier wave from the output voltage of the voltage detecting portion 13. The other structures in the velocity measuring device are identical to those above.

In the present example, the MHP waveforms can be extracted without the use of a photodiode, making it possible to reduce the components in the velocity measuring device relative to the other examples. Moreover, because no photodiode is used in the present example, this makes it is possible to exclude the influence of stray scattered light.

In the present example, preferably the driving current provided to the semiconductor laser 1 from the laser driver 4 is controlled to be near to the threshold value current for the laser oscillation. Doing so makes it easy to extract the MHPs from the voltage between the terminals of the semiconductor laser 1.

Note that, in the examples, at least the signal extracting portions 7, the calculating portion 8, the adjusting portion 12, and the controlling portion 104 may be achieved through a computer that is provided with a CPU, a storage device, and an interface, and through a program that controls these hardware resources. The CPU executes the processes explained above, in accordance with a program that is stored in the memory device.

Additionally, while in the examples that which was measured was a web 11 that is a physical object that is conveyed by a conveying device from a sending side to a receiving side, from, there is no limitation thereto. However, preferably that which is measured has an essentially constant distance L between the semiconductor laser 1 and that which is being measured, as in the example of the web 11 illustrated in FIG. 2.

While the explanations were for cases wherein the present invention was applied to a self-coupling velocity measuring device, the examples can be applied also to velocity measuring devices other than those of the self-coupling type, such as velocity measuring devices that use, for example, laser Doppler or elastic waves (soundwaves, ultrasonic waves, or the like). When the examples are applied to a velocity measuring device other than of the self-coupling type, a laser beam that is emitted from a semiconductor laser, for example, and a reflected beam may be separated by a beam splitter, or the like, and the reflected beam may be detected by a photodiode to obtain a parameter, in the reflected beam, that changes dependent on the velocity, or an ultrasonic emitter and receiver may be used similarly to perform processes based on the received waveforms.

The present invention can be applied to a technology for measuring the velocity of a physical object using electromagnetic wave interference.

The invention claimed is:

1. A velocity measuring device, comprising:
   an emitting device emitting an electromagnetic wave or an elastic wave toward a measurement object;
   an oscillating wavelength modulator causing the emitting device to operate so as to alternatingly be in a first emitting interval wherein the oscillating wavelength continuously increases monotonically and a second emitting interval wherein the oscillating wavelength continuously decreases monotonically;
   a detector detecting an electric signal that includes an interference waveform that is produced by the electromagnetic wave or elastic wave that is emitted from the emitting device and a reflected wave that is returned from the measurement object;
   a signal extractor calculating the number of interference waveforms included in the output signal of the detector during the first emitting interval and the second emitting interval; and
   a calculator calculating the velocity of measurement object based on a number of interference waveforms; wherein:
   the oscillating wavelength modulator causes the emitting device to operate so that the absolute values of the rates of change of the oscillating wavelengths in respect to time during the first emitting interval and the second emitting interval is different,
   wherein, if fmax is the maximum frequency of an interference waveform that is extracted by the signal extracting means, fmin is the minimum frequency of an interference waveform that is measured, T1 is the length of time of the first emitting interval, and T2 is the length of time of the second emitting interval P2, then (fmin/fmax)≥(T2/T1) when the measurement object moves toward the emitting device, and (fmin/fmax)≥(T1/T2) when the measurement object moves away from the emitting device.

2. The velocity measuring device as set forth in claim 1, further comprising:
   a frequency measuring device measuring respective average frequencies of the interference waveforms in the first emitting interval and in the second emitting interval; and
   a carrier wave adjustor adjusting a carrier wave for oscillating wavelength modulation of the emitting device so that the average value of the average frequency of the interference waveform in the first emitting interval and the average frequency of the interference waveform in the second oscillating frequency is equal to the average value of the maximum frequency of the interference waveform that is extracted by the signal extractor and the minimum frequency of the interference waveform that is measured.

3. The velocity measuring device as set forth in claim 1, further comprising:
   a carrier wave adjustor adjusting a carrier wave for oscillating wavelength modulation of the emitting device so that the frequency of the interference waveform in the first emitting interval when the velocity of the measurement object is 0 approaches the minimum frequency in a range that does not fall below the minimum frequency of the interference waveform that is extracted by the signal extracting means, and the frequency of the interference waveform in the second emitting interval when the velocity of the measurement object is 0 approaches the maximum frequency in a range that does not exceed the maximum frequency of the interference waveform that is extracted by the signal extractor.

4. The frequency measuring device as set forth in claim 1, wherein:
   the emitting device is a semiconductor laser; and
   the detector detects an electric signal that includes an interference waveform that is produced through a self-coupled effect between a laser beam that is an electromagnetic wave that is emitted from the semiconductor laser and a return beam that is a reflected wave that returns from the measurement object.

5. A velocity measuring method comprising:
   an oscillating step causing an emitting device to operate so as to alternatingly be in a first emitting interval wherein the oscillating wavelength continuously increases monotonically and a second emitting interval wherein the oscillating wavelength continuously decreases monotonically;
   a detecting step detecting an electric signal that includes an interference waveform that is produced by the electromagnetic wave or elastic wave that is emitted from the emitting device and a reflected wave that is returned from a measurement object;
   a signal extracting step calculating the number of interference waveforms obtained during the first emitting interval and the second emitting interval; and
   a calculating step calculating the velocity of measurement object based on a number of interference waveforms; wherein:
   the oscillating wavelength modulating step causes the emitting device to operate so that the absolute values of the rates of change of the oscillating wavelengths in respect to time during the first emitting interval and the second emitting interval are different, wherein, if fmax is the maximum frequency of an interference waveform that is measured, fmin is the minimum frequency of an interference waveform that is measured, T1 is the length of time of the first emitting interval, and T2 is the length of time of the second emitting interval P2, then (fmin/fmax)≥(T2/T1) when the measurement object moves toward the emitting device, and (fmin/fmax)≥(T1/T2) when the measurement object moves away from the emitting device.

6. The velocity measuring method as set forth in claim 5, further comprising:
   a frequency measuring step measuring respective average frequencies of the interference waveforms in the first emitting interval and in the second emitting interval; and
   a carrier wave adjusting step adjusting a carrier wave for oscillating wavelength modulation of the emitting device so that the average value of the average frequency of the interference waveform in the first emitting interval and the average frequency of the interference waveform in the second oscillating frequency are equal to the average value of the maximum frequency of the interference waveform that is measured and the minimum frequency of the interference waveform that is measured.

7. The velocity measuring method as set forth in claim 5, further comprising:

a carrier wave adjusting step adjusting a carrier wave for oscillating wavelength modulation of the emitting device so that the frequency of the interference waveform in the first emitting interval when the velocity of the measurement object is 0 approaches the minimum frequency in a range that does not fall below the minimum frequency of the interference waveform that is measured, and the frequency of the interference waveform in the second emitting interval when the velocity of the measurement object is 0 will approach the maximum frequency in a range that does not exceed the maximum frequency of the interference waveform that is measured.

8. The velocity measuring method as set forth in claim 5, wherein:

the emitting device is a semiconductor laser; and the detecting step detects an electric signal that includes an interference waveform that is produced through a self-coupled effect between a laser beam that is an electromagnetic wave that is emitted from the semiconductor laser and a return beam that is a reflected wave that returns from the measurement object.

\* \* \* \* \*